United States Patent
Moroguchi et al.

(10) Patent No.: US 10,501,377 B2
(45) Date of Patent: Dec. 10, 2019

(54) SINTERED MATERIAL, TOOL INCLUDING SINTERED MATERIAL, AND SINTERED MATERIAL PRODUCTION METHOD

(71) Applicant: Sumitomo Electric Industries, Ltd., Osaka-shi (JP)

(72) Inventors: Hironari Moroguchi, Itami (JP); Takashi Harada, Itami (JP); Satoru Kukino, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/014,241

(22) Filed: Jun. 21, 2018

(65) Prior Publication Data

US 2018/0297899 A1 Oct. 18, 2018

Related U.S. Application Data

(62) Division of application No. 15/506,079, filed as application No. PCT/JP2015/073532 on Aug. 21, 2015, now Pat. No. 10,029,948.

(30) Foreign Application Priority Data

Aug. 29, 2014 (JP) .................................. 2014-175073

(51) Int. Cl.
*C04B 35/599* (2006.01)
*C04B 35/5831* (2006.01)
(Continued)

(52) U.S. Cl.
CPC ........ *C04B 35/58014* (2013.01); *B23B 27/14* (2013.01); *B23B 27/148* (2013.01);
(Continued)

(58) Field of Classification Search
CPC ............ C04B 35/58014; C04B 35/597; C04B 35/5831
See application file for complete search history.

(56) References Cited

U.S. PATENT DOCUMENTS 4,975,395 A 12/1990 Lumby et al.
5,981,416 A 11/1999 Kume et al.
(Continued)

FOREIGN PATENT DOCUMENTS

| JP | H05-078107 A | 3/1993 |
| JP | H10-182233 A | 7/1998 |

(Continued)

OTHER PUBLICATIONS

Kita et al., "Thermal Conductivity, Strength, and Microstructure of Si—Ti—Al—O—N Porous Ceramics," Advanced Materials 93, I/A; Ceramics, Powders, Corrosion and Advanced Processing, 1994, pp. 467-470 [Cited in Parent].

(Continued)

*Primary Examiner* — Karl E Group
(74) *Attorney, Agent, or Firm* — Baker Botts L.L.P.; Michael A. Sartori

(57) ABSTRACT

To provide a sintered material having excellent oxidation resistance, as well as excellent abrasion resistance and chipping resistance. A sintered material containing a first compound formed of Ti, Al, Si, O, and N is provided.

3 Claims, 1 Drawing Sheet

(51) Int. Cl.

| | | |
|---|---|---|
| *C04B 35/58* | (2006.01) | |
| *B23B 27/14* | (2006.01) | |
| *C01B 21/082* | (2006.01) | |
| *C04B 35/10* | (2006.01) | |
| *C04B 35/56* | (2006.01) | |
| *C04B 35/581* | (2006.01) | |
| *C01B 21/064* | (2006.01) | |
| *C04B 35/117* | (2006.01) | |
| *C04B 35/597* | (2006.01) | |
| *C04B 35/626* | (2006.01) | |
| *C04B 35/645* | (2006.01) | |

(52) U.S. Cl.
CPC ........ *C01B 21/064* (2013.01); *C01B 21/0821* (2013.01); *C01B 21/0826* (2013.01); *C04B 35/10* (2013.01); *C04B 35/117* (2013.01); *C04B 35/5603* (2013.01); *C04B 35/5607* (2013.01); *C04B 35/5611* (2013.01); *C04B 35/5622* (2013.01); *C04B 35/5626* (2013.01); *C04B 35/58* (2013.01); *C04B 35/581* (2013.01); *C04B 35/58007* (2013.01); *C04B 35/58028* (2013.01); *C04B 35/5831* (2013.01); *C04B 35/597* (2013.01); *C04B 35/6267* (2013.01); *C04B 35/6268* (2013.01); *C04B 35/62665* (2013.01); *C04B 35/62675* (2013.01); *C04B 35/645* (2013.01); *C04B 2235/3217* (2013.01); *C04B 2235/3244* (2013.01); *C04B 2235/3418* (2013.01); *C04B 2235/386* (2013.01); *C04B 2235/3839* (2013.01); *C04B 2235/3843* (2013.01); *C04B 2235/3847* (2013.01); *C04B 2235/3865* (2013.01); *C04B 2235/3869* (2013.01); *C04B 2235/3873* (2013.01); *C04B 2235/3886* (2013.01); *C04B 2235/402* (2013.01); *C04B 2235/404* (2013.01); *C04B 2235/428* (2013.01); *C04B 2235/5436* (2013.01); *C04B 2235/80* (2013.01); *C04B 2235/96* (2013.01)

(56) References Cited

U.S. PATENT DOCUMENTS

| 10,029,948 B2* | 7/2018 | Moroguchi ............. B23B 27/14 |
|---|---|---|
| 2011/0058912 A1 | 3/2011 | Johansson et al. |
| 2014/0178138 A1 | 6/2014 | Watatani et al. |
| 2017/0341153 A1 | 11/2017 | Chihara et al. |

FOREIGN PATENT DOCUMENTS

| JP | H11-264066 A | 9/1999 |
|---|---|---|
| JP | 2007-131493 A | 5/2007 |
| JP | 2012-206222 A | 10/2012 |
| JP | 2013-053022 A | 3/2013 |

OTHER PUBLICATIONS

International Search Report in counterpart International Application No. PCT/JP2015/073532, dated Oct. 6, 2015 [Cited in Parent].

\* cited by examiner

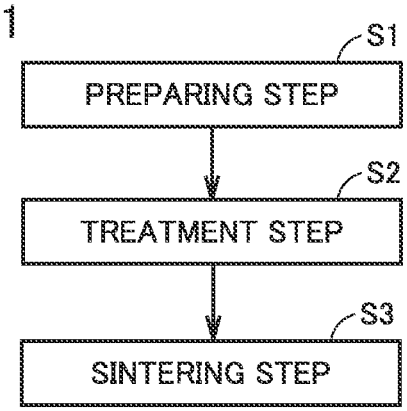
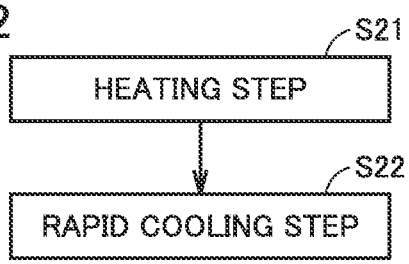
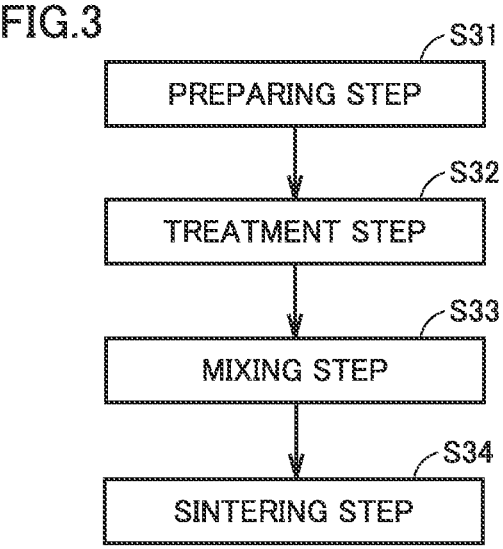

SINTERED MATERIAL, TOOL INCLUDING SINTERED MATERIAL, AND SINTERED MATERIAL PRODUCTION METHOD

CROSS-REFERENCE TO RELATED APPLICATIONS

This application is a Divisional of U.S. patent application Ser. No. 15/506,079, now U.S. Pat. No. 10,029,948, filed Feb. 23, 2017, which is a 371 of International Application Number PCT/JP2015/073532, filed Aug. 21, 2015, which claims the benefit of Japanese Patent Application No. 2014-175073, filed Aug. 29, 2014.

TECHNICAL FIELD

The present invention relates to a sintered material, a tool including a sintered material, and a method for producing a sintered material.

BACKGROUND ART

Conventionally, cutting works of steel, casts and so on have been conducted by using a tool formed of a sintered material. Since an edge of a tool is exposed to a high temperature environment during a cutting work, the tool is required to have oxidation resistance, in addition to the characteristics such as abrasion resistance and chipping resistance. As sintered bodies for which such characteristics are expected, sintered bodies formed of Ti, Al, and N are known.

For example, Japanese Patent Laying-Open No. 05-078107 (PTD 1) discloses producing a sintered material formed of $Ti_{0.5}Al_{0.5}N$ by making a powder formed of $Ti_{0.5}Al_{0.5}N$ by using a mechanical alloying (MA) method, and sintering the powder. Japanese Patent Laying-Open No. 10-182233 (PTD 2) discloses producing a titanium aluminum nitride group sintered material by making a powder formed of $Ti_{1-x}Al_xN$ (x=0.05 to 0.70) by a physical vapor-phase deposition (PVD) method, and sintering the powder. Japanese Patent Laying-Open No. 2007-131493 (PTD 3) discloses producing an Al-added TiN bulk body by making a mixture formed of Ti, Al, and N by a self-propagating high-temperature synthesis (SHS) method, and sintering the mixture.

CITATION LIST

Patent Document
PTD 1: Japanese Patent Laying-Open No. 05-078107
PTD 2: Japanese Patent Laying-Open No. 10-182233
PTD 3: Japanese Patent Laying-Open No. 2007-131493

SUMMARY OF INVENTION

Technical Problems

However, in the sintered material formed of Ti, Al, and N as described above, it tends to be difficult to improve the performance to the desired level in terms of the oxidation resistance.

Accordingly, it is an object of the present invention to provide a sintered material that is excellent in the oxidation resistance as well as in the abrasion resistance and the chipping resistance, a tool including the sintered material, and a method for producing the sintered material.

Solutions to Problems

A sintered material according to one aspect of the present invention is a sintered material containing a first compound formed of Ti, Al, Si, O, and N.

A tool according to one aspect of the present invention is a tool including the aforementioned sintered material containing the first compound formed of Ti, Al, Si, O, and N.

A method for producing a sintered material according to one aspect of the present invention includes the steps of: preparing first grains containing elements Ti, Al, and Si; treating the first grains to make second grains formed of elements Ti, Al, Si, O, and N; and sintering the second grains to make a sintered material containing a first compound formed of Ti, Al, Si, O, and N, and the step of making the second grains includes a step of heating the first grains, and a step of rapidly cooling the first grains after heating.

Advantageous Effects of Invention

According to the foregoing, it becomes possible to provide a sintered material that is excellent in the oxidation resistance as well as in the abrasion resistance and the chipping resistance, a tool including the sintered material, and a method for producing the sintered material.

BRIEF DESCRIPTION OF DRAWINGS

FIG. 1 is a flow chart for illustrating a method for producing a sintered material according to a third embodiment.

FIG. 2 is a flow chart for illustrating a treatment step.

FIG. 3 is a flow chart for illustrating a method for producing a sintered material according to a fourth embodiment.

DESCRIPTION OF EMBODIMENTS

Description of Embodiments of the Present Invention

First, description is made by listing embodiments of the present invention. [1] A sintered material according to one aspect of the present invention contains a first compound formed of Ti, Al, Si, O, and N.

The first compound formed of Ti, Al, Si, O, and N may have a compound formed of Ti, Al, Si, O, and N (hereinafter, referred to as "TiAlSiON compound"), and thus, it is capable of having high oxidation resistance as well as high abrasion resistance and high chipping resistance. Therefore, the sintered material according to one aspect of the present invention is capable of having the characteristics of excellent oxidation resistance as well as excellent abrasion resistance and chipping resistance.

[2] In the aforementioned sintered material, preferably, the first compound contains $Ti_{(1-a-b)}Al_aSi_bO_xN_y$, and a, b, x and y in $Ti_{(1-a-b)}Al_aSi_bO_xN_y$ respectively satisfy $0.01 \leq a \leq 0.70$, $0.01 \leq b \leq 0.55$, $0.06 \leq a+b \leq 0.88$, $0.005 \leq x \leq 0.6$, $0.4 \leq y \leq 0.995$, and $0.5 \leq x+y \leq 1$. Accordingly, the sintered material is further excellent in the aforementioned characteristics.

[3] In the aforementioned sintered material, preferably, a content of the first compound is greater than or equal to 10% by volume and less than or equal to 100% by volume. When the content of the first compound in the sintered material is less than 10% by volume, the aforementioned characteristics of the sintered material tend to deteriorate.

[4] Preferably, the aforementioned sintered material further contains at least one selected from the group consisting of a second compound, a third compound, a fourth compound and a first metal. The second compound is cubic boron nitride, the third compound is a compound of at least one element selected from Al and Si, and at least one element selected from the group consisting of B, C, N, and O, the fourth compound is a compound of at least one element selected from the group consisting of elements in Group 4, elements in Group 5, and elements in Group 6 of the periodic table, and at least one element selected from the group consisting of B, C, N, and O, and the first metal is a metal formed of at least one selected from the group consisting of Ti, V, Cr, Mn, Co, Ni, Cu, Al, Sn, Si, Zr, Nb, Mo, Ag, Hf, Ta, W, and Pb. In this case, by appropriately adjusting the respective compositions and the content rates in the sintered material of the second compound, the third compound, the fourth compound and the first metal, it is possible to adjust the balance among various characteristics of the sintered material, and thus it is possible to provide sintered bodies suited for various needs.

[5] A tool according to one aspect of the present invention is a tool including the aforementioned sintered material. Since the aforementioned sintered material is excellent in the characteristics including the abrasion resistance, the chipping resistance and the oxidation resistance, the tool including the sintered material is also capable of being excellent in these characteristics. Therefore, the tool according to one aspect of the present invention may have a longer service life compared with conventional tools.

[6] A method for producing a sintered material according to one aspect of the present invention includes the steps of: preparing first grains containing elements Ti, Al, and Si; treating the first grains to make second grains formed of elements Ti, Al, Si, O, and N; and sintering the second grains to make a sintered material containing a first compound formed of Ti, Al, Si, O, and N, and the step of making the second grains includes a step of heating the first grains, and a step of rapidly cooling the first grains after heating.

According to the method for producing a sintered material according to one aspect of the present invention, it is possible to produce a sintered material containing a first compound formed of Ti, Al, Si, O, and N. Such a first compound is also excellent in the characteristics including the abrasion resistance, the chipping resistance and the oxidation resistance, and hence the sintered material containing the first compound is also capable of being excellent in these characteristics.

[7] Preferably, the aforementioned production method includes a step of mixing second grains with third grains before the step of making the sintered material. The third grains are formed of at least one selected from the group consisting of a fifth compound, a sixth compound, a seventh compound and a second metal. The fifth compound is cubic boron nitride. The sixth compound is a compound of at least one element selected from Al and Si, and at least one element selected from the group consisting of B, C, N, and O. The seventh compound is a compound of at least one element selected from the group consisting of elements in Group 4, elements in Group 5, and elements in Group 6 of the periodic table, and at least one element selected from the group consisting of B, C, N, and O. The second metal is a metal formed of at least one selected from the group consisting of Ti, V, Cr, Mn, Co, Ni, Cu, Al, Sn, Si, Zr, Nb, Mo, Ag, Hf, Ta, W, and Pb. In this case, in the sintering step, a mixture of the second grains and the third grains is sintered, and the produced sintered material is capable of having a desired second compound in addition to the aforementioned first compound. Therefore, it is possible to adjust the balance among various characteristics of the sintered material, and thus it is possible to provide sintered bodies suited for various needs.

[8] In the aforementioned production method, preferably, the mixing step is executed in such a manner that a content of the third grains in mixed grains of the second grains and the third grains is less than or equal to 90% by volume. As a result, it is possible to produce a sintered material additionally having the characteristics possessed by the second compound, while sufficiently keeping the characteristics possessed by the first compound.

Details of the Embodiments of the Present Invention

Hereinafter, the embodiments of the present invention will be specifically described.

The term "metal" as used herein is not limited to a simple metal formed of one metal element such as "Co" but includes alloys formed of two or more metal elements such as "$CoSi_2$," unless otherwise specified. The term "compound" as used herein represents a compound formed of one or more metal elements and one or more nonmetal elements. As the nonmetal element, B, C, N, and O can be recited.

When an atomic ratio is not particularly specified in a chemical formula described herein, the atomic ratio among the elements is not necessarily an equal ratio, but includes any conventionally known atomic ratio. For example, "TiN" covers those having an atomic ratio between Ti and N of 2:1, 1:0.95, 1:0.9, 1:0.3, as well as 1:1, and "TiZrN" covers those having an atomic ratio among Ti, Zr and N of any conventionally known atomic ratio as well as 25:25:50.

First Embodiment

The sintered material according to the first embodiment is a sintered material containing a first compound formed of Ti, Al, Si, O, and N. Herein, the sintered material is a bulk sintered material, and has a massive form which is different from the form of a thin film (coating). A sintered material and a thin film are different from each other not only in their characteristics but also in their use purposes and production methods owing to the difference in their forms. In general, the thickness of a thin film is about 5 μm, and a thin film having a thickness of greater than or equal to 100 μm cannot be produced substantially. In contrast, the thickness of the sintered material can be made greater than or equal to 100 μm.

The sintered material containing the first compound formed of Ti, Al, Si, O, and N is a novel product that can be produced by the production method as will be described later, and is largely different in its configuration from conventional sintered bodies formed of Ti, Al, and N (hereinafter, also referred to as "TiAlN sintered material").

Concretely, a conventional TiAlN sintered material contains a compound formed of Ti, Al, and N (hereinafter, also referred to as "TiAlN compound"). Such a TiAlN compound normally has such a structure that Al is dissolved in a crystal structure formed of Ti and N. In contrast, the first compound contained in the sintered material according to the first embodiment includes a compound formed of Ti, Al, N, Si, and O (hereinafter, referred to as "TiAlSiON compound"). The TiAlSiON compound has such a structure that Al, Si, and O are dissolved in a crystal structure formed of Ti and N. It goes without saying that the aforementioned first compound can contain unintended inevitable impurities.

When the sintered material according to the first embodiment contains the aforementioned first compound, the sintered material can have high oxidation resistance, as well as high hardness and high abrasion resistance. This is ascribable to the fact that the first compound formed of the TiAlSiON compound has high abrasion resistance and high chipping resistance, and is more excellent in oxidation resistance than the TiAlN compound.

In the sintered material according to the first embodiment, preferably, the first compound contains $Ti_{(1-a-b)}Al_aSi_bO_xN_y$, and a, b, x and y in $Ti_{(1-a-b)}Al_aSi_bO_xN_y$ respectively satisfy $0.01 \leq a \leq 0.70$, $0.01 \leq b \leq 0.55$, $0.06 \leq a+b \leq 0.88$, $0.005 \leq x \leq 0.6$, $0.4 \leq y \leq 0.995$, and $0.5 < x+y \leq 1$. When the first compound contains the TiAlSiON compound satisfying the aforementioned composition ratio, the sintered material can have still higher oxidation resistance. The reason is presumed by the present inventors as follows.

When the first compound contains $Ti_{(1-a-b)}Al_aSi_bO_xN_y$, and a, b, x and y in $Ti_{(1-a-b)}Al_aSi_bO_xN_y$ respectively satisfy the aforementioned ranges, Al contained in the first compound forms a coating of an Al oxide that is thermodynamically stable, and Si densities the Al oxide coating, with the result that the aforementioned characteristics of the sintered material are further improved.

Preferably, a, b, x and y in $Ti_{(1-a-b)}Al_aSi_bO_xN_y$ respectively satisfy $0.30 \leq a \leq 0.70$, $0.10 \leq b \leq 0.20$, $0.01 \leq x \leq 0.30$, and $0.80 \leq y \leq 0.99$. In this case, the aforementioned characteristics are significantly improved.

However, the content of the first compound in the sintered material according to the first embodiment is preferably greater than or equal to 10% by volume and less than or equal to 100% by volume, more preferably greater than or equal to 16% by volume, further preferably greater than or equal to 20% by volume, particularly preferably greater than or equal to 40% by volume, and especially preferably greater than or equal to 50% by volume. When the content of the first compound in the sintered material is less than 10% by volume, the aforementioned characteristics of the sintered material tend to deteriorate. This is ascribable to the fact that the contents of compounds, metals and the like other than the TiAlSiON compound in the sintered material increase.

Preferably, the sintered material according to the first embodiment further contains at least one selected from the group consisting of the second compound, the third compound, the fourth compound and the first metal.

The second compound is cubic boron nitride. The third compound is a compound of at least one element selected from Al and Si, and at least one element selected from the group consisting of B, C, N, and O. The fourth compound is a compound of at least one element selected from the group consisting of elements in Group 4 (Ti, Zr, Hf, etc.), elements in Group 5 (V, Nb, Ta, etc.) and elements in Group 6 (Cr, Mo, W, etc.) of the periodic table, and at least one element selected from the group consisting of B, C, N, and O. The first metal is a metal formed of at least one selected from the group consisting of Ti, V, Cr, Mn, Co, Ni, Cu, Al, Sn, Si, Zr, Nb, Mo, Ag, Hf, Ta, W, and Pb.

When the sintered material contains at least one selected from the group consisting of the second compound, the third compound, the fourth compound and the first metal (hereinafter, these are also referred to as "specific substances other than the first compound" for convenience), these exist on the boundary between grains of the first compound. That is, the specific substances other than the first compound exist in the sintered material between a grain formed of the first compound and another grain formed of the first compound neighboring the grain.

Since grains of the first compound are strongly bound by the existence of the grains formed of other substances than the first compound on the boundary of the grains formed of the first compound, the sintered material further has excellent chipping resistance. This is because the sintered material containing the first compound and the second compound is made by sintering a mixture of the second grains which serve as a material of the first compound (later described) and the third grains which serve as a material of the specific substances other than the first compound, and in this case, a reaction product is produced on the boundaries between the second grains and the third grains during sintering, resulting in strong binding between the first compound and the second compound.

When the sintered material contains the specific substances other than the first compound, in addition to the characteristics resulting from the characteristics of the first compound, characteristics resulting from the specific substances other than the first compound can be provided. Therefore, by appropriately adjusting the composition of the specific substances other than the first compound, the sintered material can flexibly respond to various needs required for various cutting conditions.

For example, when the sintered material contains cubic boron nitride (second compound), the sintered material is capable of having high hardness resulting from the second compound, in addition to improved chipping resistance resulting from the second compound on the boundary of the first compound because cubic boron nitride has very high hardness.

Concrete examples of the aforementioned third compound include borides such as $SiB_4$ and aluminum boride ($AlB_{12}$), carbides such as silicon carbide (SiC), nitrides such as aluminum nitride (AlN) and silicon nitride ($Si_3N_4$), and oxides such as silicon oxide ($SiO_2$) and aluminum oxide ($Al_2O_3$).

Concrete examples of the aforementioned fourth compound include borides such as titanium boride ($TiB_2$), zirconium boride ($ZrB_2$), hafnium boride ($HfB_2$), vanadium boride (VB), niobium boride ($NbB_2$), tantalum boride ($TaB_2$), chromium boride ($CrB_2$), molybdenum boride (MoB) and tungsten boride (WB). Also included are carbides such as titanium carbide (TiC), zirconium carbide (ZrC), hafnium carbide (HfC), vanadium carbide (VC), niobium carbide (NbC), tantalum carbide (TaC), chromium carbide ($Cr_3C_2$), molybdenum carbide ($Mo_2C$), and tungsten carbide (WC). Also included are nitrides composed of one metal element and nitrogen such as titanium nitride (TiN), zirconium nitride (ZrN), hafnium nitride (HfN), vanadium nitride (VN), niobium nitride (NbN), tantalum nitride (TaN), chromium nitride ($Cr_2N$), molybdenum nitride (MoN), and tungsten nitride (WN).

Other concrete examples of the aforementioned fourth compound include nitrides composed of two metal elements and nitrogen such as titanium zirconium nitride (TiZrN), titanium hafnium nitride (TiHfN), titanium vanadium nitride (TiVN), titanium niobium nitride (TiNbN), titanium tantalum nitride (TiTaN), titanium chromium nitride (TiCrN), titanium molybdenum nitride (TiMoN), titanium tungsten nitride (TiWN), zirconium hafnium nitride (ZrHfN), zirconium vanadium nitride (ZrVN), zirconium niobium nitride (ZrNbN), zirconium tantalum nitride (ZrTaN), zirconium chromium nitride (ZrCrN), zirconium molybdenum nitride (ZrMoN), zirconium tungsten nitride (ZrWN), hafnium vanadium nitride (HfVN), hafnium niobium nitride (HfNbN), hafnium tantalum nitride (HfTaN), hafnium chromium nitride (HfCrN), hafnium molybdenum nitride (HfMoN), hafnium tungsten nitride (HfWN), vanadium niobium nitride (VNbN), vanadium tantalum nitride (VTaN), vanadium chromium nitride (VCrN), vanadium molybdenum nitride (VMoN), vanadium tungsten nitride (VWN), niobium tantalum nitride (NbTaN), niobium chromium nitride (NbCrN), niobium molybdenum nitride (NbMoN), niobium tungsten nitride (NbWN), tantalum chromium nitride (TaCrN), tantalum molybdenum nitride (TaMoN), tantalum tungsten nitride (TaWN), chromium molybdenum nitride (CrMoN), chromium tungsten nitride (CrWN), and molybdenum chromium nitride (MoWN). Also included are oxides such as titanium oxide ($TiO_2$), zirconium oxide ($ZrO_2$), hafnium oxide ($HfO_2$), vanadium oxide ($V_2O_5$), niobium oxide ($Nb_2O_5$), tantalum oxide ($Ta_2O_5$), $Cr_2O_3$, molybdenum oxide ($MoO_3$), and tungsten oxide ($WO_3$).

Concrete examples of the aforementioned first metal include simple metals such as Co and Ni recited in the above, and alloys such as $CoSi_2$, $Ti_3Al$, TiAl, $TiAl_3$, $TiSi_2$, $Ti_5Si_3$, $Ti_5Si_4$, TiSi, and $Ti_3Si$.

Second Embodiment

A tool according to the second embodiment is a tool including the sintered material according to the first embodiment. As described above, since the sintered material containing the first compound formed of Ti, Al, Si, O, and N is excellent in the characteristics including the hardness, the chipping resistance and the oxidation resistance, the tool including the sintered material is also excellent in these characteristics.

Examples of the tool according to the second embodiment include end mills, indexable cutting insert(s) for milling, and indexable cutting insert(s) for turning. The tool may be entirely formed of the aforementioned sintered material, or partly formed of the sintered material (for example, the edge part may be formed of the sintered material).

When the tool is entirely formed of the aforementioned sintered material, the tool can be made by working the sintered material into a desired form. When the tool is partly formed of the aforementioned sintered material, the tool can be made by joining the sintered material to a desired position of the base constituting the tool. While the method of joining the sintered material is not particularly limited, it is preferred to provide a joining layer for binding the base to the sintered material strongly between the base and the sintered material from the view point of preventing the sintered material from coming off the base.

Third Embodiment

The method for producing a sintered material according to the third embodiment includes the step of preparing first grains containing elements Ti, Al, and Si (preparing step), the step of treating the first grains to make second grains formed of elements Ti, Al, Si, O, and N (treatment step), and the step of sintering the second grains to make a sintered material containing a first compound formed of Ti, Al, Si, O, and N (sintering step). The aforementioned treatment step includes a step of heating the first grains (heating step) and a step of rapidly cooling the first grains after heating (rapid cooling step). Hereinafter, each step will be described with reference to FIGS. 1 and 2.

(Preparing Step)

Referring to FIG. 1, first grains containing elements Ti, Al, and Si are prepared in the preparing step of S1.

The first grains are material grains that are materials of the first compound. In particular, among Ti, Al, Si, O, and N that compose the first compound, metal elements such as Ti, Al, and Si are supplied exclusively from the first grains. Therefore, the first grains are required to have at least a composition ratio among Ti, Al, and Si similar to the composition of the intended first compound. On the other hand, among Ti, Al, Si, O, and N that compose the first compound, nonmetal elements such as O and N can be supplied also from the atmosphere in the later-described treatment step (nitrogen atmosphere) as well as from the first grains. Therefore, the first grains are not necessarily required to have O and N similar to those in the composition of the first compound.

When it is difficult to have the intended composition ratio among Ti, Al, and Si in the first compound only by using one kind of material grains having a specific composition as the first grains, it is possible to use the first grains in the form of a mixture of two or more kinds of material grains having different compositions.

As the aforementioned material grains, grains formed of one element such as Ti grains, Al grains, or Si grains, and grains formed of two or more elements selected from Ti, Al, and Si can be recited. Examples of the aforementioned grains formed of two elements include grains formed of Ti and Al such as $Ti_3Al$, TiAl, $TiAl_3$, grains formed of Ti and Si such as TiSi, $Ti_3Si$, $TiSi_2$, $Ti_5Si_3$, and $Ti_5Si_4$, and grains formed of Al and Si such as an AlSi alloy. Examples of the aforementioned grains formed of three elements include a TiAlSi alloy.

As the aforementioned material grains, grains formed of nitrides, oxides, or oxynitrides of one or more elements selected from the group consisting of Ti, Al, and Si can be recited. Concrete examples include grains formed of nitrides, oxides or oxynitrides of Ti such as TiN, $TiO_2$, TiO, and TiON, grains formed of nitrides, oxides or oxynitrides of Al such as AN, $Al_2O_3$, and AlON, grains formed of nitrides, oxides or oxynitrides of Si such as $Si_3N_4$, $SiO_2$, and SiON, and SiAlON, $Si_2Al_3O_{13}$ and so on.

When material grains formed of two or more elements selected from elements Ti, Al, and Si are used, it is possible to generate the first grains having a more uniform composition. When material grains formed of nitrides, oxides, or oxynitrides of one or more selected from the group consisting of Ti, Al, and Si are used as the first grains, it is possible to easily adjust the amounts of N and O to be added to the first grains in the later-described treatment step.

The average grain size of the first grains is preferably less than or equal to 10 μm. When the first grains having such a grain size are used, it is possible to further increase the reactivity between grains in the later-described treatment step, and it is possible to make grains abundantly containing the second grains having the intended composition. The term average grain size of grains as used herein means a median radius based on the grain size distribution of grains measured by a known grain size distribution measuring method such as a laser diffraction method.

The first grains prepared in the present step are preferably subjected to pressure-forming for supply to the later-described treatment step. The method for the pressure-forming is not particularly limited, and any known methods can be used.

(Treatment Step)

Next, in the treatment step of step S2 in FIG. 1, the first grains are treated to make second grains formed of elements Ti, Al, Si, O, and N. The present step includes a step of heating the first grains (heating step), and a step of rapidly cooling the first grains after heating (rapid cooling step). These steps are described with reference to FIG. 2.

Referring to FIG. 2, first, the first grains are heated in the heating step of step S21. By the heating step, a shortfall of N in the first grains is given. The term "shortfall of N" corresponds to a difference between the composition ratio of the nitrogen element in the first grains, and the intended composition ratio of the TiAlSiON compound in the first compound.

In this heating step, a powder made up of the first grains or a compact formed by pressure-forming of the first grains is placed in a vacuum atmosphere, in a nitrogen atmosphere or in an argon atmosphere. The atmosphere in which the first grains are placed can be appropriately selected according to the composition of the first grains.

For example, when the first grains contain O in addition to the elements Ti, Al, and Si, and the content of O satisfies the amount intended in the first compound, the first grains are placed in an atmosphere containing nitrogen gas. When the first grains contain N and O in addition to the elements Ti, Al, and Si, and the respective contents of N and O satisfy the amounts intended in the first compound, the first grains can be placed in an argon atmosphere or in a vacuum atmosphere.

Examinations made by the present inventors have revealed that the amount of O intended in the second grains is satisfied even when the first grains, in its composition, do not satisfy the amount of O intended in the first compound. This is because there is oxygen adsorbed on the surface of the first grains, and the oxygen is taken into the first grains by the heating step, and the oxygen amount reaches the amount compensating the shortfall of O.

The heating temperature, atmospheric pressure, and partial pressure of each gas in the heating step can be appropriately adjusted, and for example, the heating temperature is preferably greater than or equal to 1500° C., and the atmospheric pressure is preferably greater than or equal to 0.1 atm.

Next, in the rapid cooling step of step S22, the powder made up of the first grains, or the compact of the first grains to which N and O have been given by heating in the aforementioned heating step is cooled. Hereinafter, the powder made up of the first grains, or the compact of the first grains to which N and O have been given through the aforementioned heating step is called a precursor of second grains.

The cooling speed of the precursor of second grains in the rapid cooling step is at least higher than the cooling speed by the furnace cooling, and is preferably higher than or equal to 100° C./sec, more preferably higher than or equal to 200° C./sec. The cooling speed by the furnace cooling is generally about 20° C./min.

By the aforementioned rapid cooling step, it is possible to obtain second grains formed of Ti, Si, Al, O and N. To be more specific, second grains are formed of Ti, Si, Al, O and N, and the entirety or the majority of the second grains are formed of the TiAlSiON compound. The composition ratio of the TiAlSiON compound contained in the second grains substantially coincides with the composition ratio of the TiAlSiON compound intended for the first compound.

When the aforementioned heating step and the aforementioned rapid cooling step are executed by using a compact of the first grains, a structure formed of Ti, Al, Si, O, and N is obtained after the rapid cooling step. Since the composition of the structure coincides with that of the second grains, or in other words, the structure is formed of the second grains, the second grains are also obtained in the case where the structure is obtained in this manner.

While the aforementioned structure may be directly used in the later-described sintering step, it is preferred to obtain the second grains in a particulate form by grinding the structure so as to increase the sintering efficiency and conduct uniform sintering. The grinding technique is not particularly limited, and for example, the technique of roughly grinding the structure by a known method, and then bringing grinding media into collision by a vibrating mill or a tumbling mill to further grind the structure can be employed. Through the grinding, it is possible to obtain the second grains in a particulate form.

In the treatment step of step S2, by conducting the heating step and the rapid cooling step consecutively as described above, it is possible to obtain the second grains. This is due to the following reasons. When the rapid cooling step is not executed consecutively after the heating step, grains having a composition that does not satisfy the intended composition tend to be formed. For example, when the first grains are heated by using a heating furnace, and then the first grains after heating (precursor of second grains) are simply furnace cooled without being subjected to the rapid cooling step, the temperature of the heated first grains decrease very slowly. In this case, Si or Al becomes easy to drop off from the TiAlSiON compound generated in the heating step, resulting in generation of grains having a composition that does not satisfy the intended composition in the first compound. In contrast, when the rapid cooling step is executed consecutively after the heating step, it is possible to prevent such drop-off of an element effectively, and it is possible to prevent generation of grains having an unintended composition as described above.

As the method that allows consecutive execution of the heating step and the rapid cooling step as described above, the following methods can be mentioned: (1) a method of heating the first grains in a reaction chamber in a desired atmosphere by using a heat source such as a carbon heater, subsequently evacuating the atmospheric gas, and introducing a cooling gas such as Ar, (2) a method of synthesizing the first grains by combustion in a reaction chamber in a desired atmosphere, and (3) a method of causing the first grains to pass through high temperature plasma in a reaction chamber in a desired atmosphere.

Preferred conditions in the heating step when the method (1) is employed are shown below. The cooling speed can be higher than or equal to 100° C./sec, and further can be higher than or equal to 200° C./sec.

Heating temperature: greater than or equal to 1500° C. and less than or equal to 2000° C.

Atmospheric pressure: greater than or equal to 0.1 atm

Heating time: greater than or equal to 1 hour

Preferred conditions in the heating step when the method (2) is employed are shown below. The cooling speed can be higher than or equal to 100° C./min, and further can be higher than or equal to 200° C./min.

Heating temperature: greater than or equal to 2000° C. and less than or equal to 3000° C.

Atmospheric pressure: greater than or equal to 1.0 atm

Heating time: greater than or equal to 3 seconds

Preferred conditions in the heating step when the method (3) is employed are shown below. The cooling speed can be higher than or equal to 500° C./sec, and further can be higher than or equal to 1000° C./sec.

Heating temperature: greater than or equal to 2000° C. and less than or equal to 5000° C.

Atmospheric pressure: greater than or equal to 0.1 atm

Heating time: greater than or equal to 0.5 second

While the second grains are made by the present step, the present step may be repeated when it is difficult to make the second grains having a desired composition by execution of the present step only once. In that case, it is not necessarily required to repeat the same treatment method, and the present step may be executed by appropriately combining the methods of (1) to (3).

(Sintering Step)

Next, in the sintering step of step S3 in FIG. 1, the second grains are sintered to make a sintered material containing the first compound formed of Ti, Al, Si, O, and N.

Sintering of the second grains is preferably conducted after pressure forming of the second grains. Sintering may be conducted simultaneously with the pressure forming. As a method for simultaneously conducting the pressure forming and the sintering, a hot press (HP) method, a spark plasma sintering (SPS) method, and an ultrahigh-pressure sintering method can be recited. Moreover, after forming by a cold isostatic pressurization (CIP) method, sintering by using a hot isostatic pressurization (HIP) method may be conducted. A normal-pressure sintering method may be used in place of the aforementioned pressure sintering methods.

This step is preferably executed under an inert atmosphere so as to prevent the composition of the first compound in the sintered material from largely changing from the composition of the second grains. At the time of sintering, the pressure is preferably greater than or equal to 40 MPa and less than or equal to 20 GPa, and the temperature is preferably greater than or equal to 1100° C. and less than or equal to 2500° C. This is because when the temperature at the time of sintering is less than 1100° C., the sintering is insufficient, and a dense sintered material tends not to be obtained, whereas when the temperature is greater than 2500° C., there is a concern that the composition of the first compound in the sintered material largely changes from the composition of the second grains. While the time required for sintering varies depending on the amount (volume) of the second grains, temperature and the like, it can be greater than or equal to 15 minutes when the sintering temperature is, for example, greater than or equal to 1100° C. and less than or equal to 2500° C.

By conducting the aforementioned sintering step, the second grains are sintered, and thus a sintered material formed of the first compound formed of Ti, Al, Si, O, and N can be obtained.

According to the production method of the third embodiment specifically described above, it is possible to produce a sintered material containing the first compound formed of Ti, Al, Si, O, and N, and thus it is possible to provide a sintered material having high abrasion resistance, high chipping resistance and high oxidation resistance. Moreover, by working the produced sintered material into a desired shape by cutting with a laser or wire discharge, it is possible to provide a tool formed of the sintered material, or a tool including the sintered material.

Fourth Embodiment

The production method of a sintered material according to the fourth embodiment is different from the third embodiment in that it includes the step of mixing the second grains made by the treatment step with the third grains (mixing step) before the sintering step as shown in FIG. 3. Hereinafter, the mixing step will be described with reference to FIG. 3. Since the preparing step of step S31, the treatment step of step S32, and the sintering step of step S34 in FIG. 3 are respectively similar to steps S1 to S3 in the third embodiment, the description thereof is not repeated.

(Mixing Step)

Referring to FIG. 3, in the mixing step of step S33, the second grains obtained in the treatment step of step S32 are mixed with third grains having a different composition from that of the second grains.

The third grains are formed of at least one selected from the group consisting of a fifth compound, a sixth compound, a seventh compound and a second metal.

The fifth compound is cubic boron nitride. The sixth compound is a compound of at least one element selected from Al and Si, and at least one element selected from the group consisting of B, C, N, and O, and concrete examples include compounds similar to the first compound specifically described in the first embodiment. The seventh compound is a compound of at least one element selected from the group consisting of elements in Group 4, elements in Group 5, and elements in Group 6 of the periodic table, and at least one element selected from the group consisting of B, C, N, and O, and concrete examples include compounds similar to the second compound specifically described in the first embodiment. The second metal is a metal formed of at least one selected from the group consisting of Ti, V, Cr, Mn, Co, Ni, Cu, Al, Sn, Si, Zr, Nb, Mo, Ag, Hf, Ta, W, and Pb, and concrete examples include metals similar to the first metal specifically described in the first embodiment.

Preferably, the third grains contain, in particular, cubic boron nitride. For example, when the third grains are formed of cubic boron nitride, sintering of a mixture of such third grains and the second grains results in the second compound mostly formed of cubic boron nitride having excellent hardness. Moreover, when the third grains are formed of cubic boron nitride, it is possible to make $Si_3N_4$ reside near the boundary with the first compound in the second compound of the produced sintered material. In this case, it is possible to bind both grains (the grains formed of the first compound and the grains formed of the second compound) strongly, and to reduce the abrasion due to drop-off of the grains.

Preferably, the present step is executed with the content of the third grains in the mixed grains of the second grains and the third grains being less than or equal to 90% by volume. When the content of the third grains is greater than 90% by volume, the proportion of the first compound in the sintered material is too low, and the effect derived from the first compound tends to decrease significantly.

More preferably, the present step is executed with the content of the third grains in the mixed grains of the second grains and the third grains being less than or equal to 50% by volume. In particular, when the third grains contain metal grains (grains formed exclusively of a metal element), it is preferred that the content of metal grains in the mixed grains is less than or equal to 20% by volume. When the content of the metal grains in the mixed grains is greater than 20% by volume, the hardness of the produced sintered material tends to decrease.

By conducting the aforementioned mixing step, a mixture made up of the second grains and the third grains is obtained, and by sintering the mixture in the sintering step of step S34, it is possible to obtain a sintered material formed of the first compound and the second compound.

In the present embodiment, the third grains are contained in the second compound with most of the third grains keeping the composition. In other words, the composition of the third grains and the composition of the compound and/or metal contained in the second compound almost coincide with each other. However, there is also a case where a compound having a composition different from the composition of the third grains is contained in the second compound. This is because a compound is generated as a result of binding of an element composing the second grains to an element composing the third grains on the boundary between the second grains and the third grains.

According to the production method according to the fourth embodiment specifically described above, it is possible to produce a sintered material containing the first compound formed of Ti, Al, Si, O, and N, and the second compound having a composition different from that of the first compound. Such a sintered material can exert the characteristics resulting from the second compound in addition to the characteristics resulting from the first compound. Therefore, according to the production method according to the fourth embodiment, it is possible to provide a tool having high abrasion resistance, high chipping resistance and high oxidation resistance, and responding to various needs of cutting conditions.

EXAMPLES

The present invention will be described more specifically by way of examples and comparative examples. It is to be noted that the present invention is not limited by these examples and comparative examples.

[Study 1]

By executing the preparing step and the treatment step as described above, second grains formed of Ti, Al, Si, O, and N were made, and their characteristics were evaluated.

Examples 1 to 58

(Preparing Step)

As the first grains, material grains that were a mixture of material grains A, material grains B and material grains C shown in Table 1 below were prepared. For example, in Example 1, by mixing Ti grains as material grains A, Al grains as material grains B, and Si grains as material grains C in a mixing ratio (material grains A:material grains B:material grains C) of 80:10:10 by mass, first grains were prepared. The average grain sizes of respective first grains prepared in Examples 1 to 58 are shown in Table 1. Then, the prepared respective first grains were subjected to pressure forming to make compacts formed of the respective first grains.

TABLE 1

| | First grains | | | | | | Mixing ratio | | |
|---|---|---|---|---|---|---|---|---|---|
| | A | | B | | C | | (wt %) | | |
| | Composition | Grain size (μm) | Composition | Grain size (μm) | Composition | Grain size (μm) | A | B | C |
| Example 1 | Ti | 10 | Al | 10 | Si | 10 | 80 | 10 | 10 |
| Example 2 | Ti | 45 | Al | 45 | Si | 45 | 80 | 10 | 10 |
| Example 3 | Ti | 10 | Al | 10 | Si | 10 | 80 | 10 | 10 |
| Example 4 | Ti | 10 | Al | 10 | Si | 10 | 80 | 10 | 10 |
| Example 5 | Ti | 10 | Al | 10 | Si | 10 | 80 | 10 | 10 |
| Example 6 | Ti | 10 | Al | 10 | Si | 10 | 80 | 10 | 10 |
| Example 7 | Ti | 10 | Al | 10 | Si | 10 | 80 | 10 | 10 |
| Example 8 | Ti | 10 | Al | 10 | Si | 10 | 80 | 10 | 10 |
| Example 9 | Ti | 45 | Al | 45 | Si | 45 | 80 | 10 | 10 |
| Example 10 | Ti | 10 | Al | 10 | Si | 10 | 80 | 10 | 10 |
| Example 11 | Ti | 10 | Al | 10 | Si | 10 | 80 | 10 | 10 |
| Example 12 | Ti | 45 | Al | 45 | Si | 45 | 80 | 10 | 10 |
| Example 13 | Ti | 10 | Al | 10 | Si | 10 | 80 | 10 | 10 |
| Example 14 | Ti | 10 | Al | 10 | Si | 10 | 80 | 10 | 10 |
| Example 15 | Ti | 10 | Al | 10 | Si | 10 | 80 | 10 | 10 |
| Example 16 | Ti | 10 | Al | 10 | $Si_3N_4$ | 10 | 80 | 10 | 10 |
| Example 17 | Ti | 10 | $Al_2O_3$ | 10 | Si | 10 | 80 | 10 | 10 |
| Example 18 | TiN | 10 | Al | 10 | Si | 10 | 80 | 10 | 10 |
| Example 19 | Ti | 10 | Al | 10 | $Si_3N_4$ | 10 | 80 | 10 | 10 |
| Example 20 | Ti | 10 | $Al_2O_3$ | 10 | Si | 10 | 80 | 10 | 10 |
| Example 21 | TiN | 10 | Al | 10 | Si | 10 | 50 | 25 | 25 |
| Example 22 | Ti | 10 | Al | 10 | $Si_3N_4$ | 10 | 80 | 10 | 10 |
| Example 23 | Ti | 10 | $Al_2O_3$ | 10 | Si | 10 | 80 | 10 | 10 |
| Example 24 | TiN | 10 | Al | 10 | Si | 10 | 80 | 10 | 10 |
| Example 25 | $Ti_3Al$ | 10 | $Si_3N_4$ | 10 | — | — | 90 | 10 | 0 |
| Example 26 | $Ti_3Al$ | 45 | $Si_3N_4$ | 10 | — | — | 90 | 10 | 0 |
| Example 27 | $Ti_3Al$ | 10 | $Si_3N_4$ | 1 | — | — | 90 | 10 | 0 |
| Example 28 | $Ti_3Al$ | 10 | Si | 10 | — | — | 88 | 12 | 0 |
| Example 29 | $Ti_3Si$ | 10 | Al | 10 | — | — | 40 | 60 | 0 |
| Example 30 | $Ti_3Si$ | 10 | $Al_2O_3$ | 10 | — | — | 40 | 60 | 0 |
| Example 31 | $Ti_3Si$ | 10 | AlN | 10 | — | — | 40 | 60 | 0 |
| Example 32 | Ti | 10 | AlSi | 10 | — | — | 20 | 80 | 0 |
| Example 33 | TiN | 10 | AlSi | 10 | — | — | 20 | 80 | 0 |
| Example 34 | Ti | 10 | SiAlON | 10 | — | — | 50 | 50 | 0 |
| Example 35 | $Ti_3Al$ | 10 | $SiO_2$ | 10 | — | — | 50 | 50 | 0 |
| Example 36 | Ti | 10 | AlN | 10 | $SiO_2$ | 10 | 20 | 60 | 20 |
| Example 37 | Ti | 10 | AlN | 10 | $SiO_2$ | 10 | 20 | 60 | 20 |
| Example 38 | Ti | 10 | $Al_2O_3$ | 10 | $Si_3N_4$ | 10 | 50 | 25 | 25 |
| Example 39 | Ti | 10 | $Al_2O_3$ | 10 | $Si_3N_4$ | 10 | 50 | 25 | 25 |

TABLE 1-continued

| | First grains | | | | | | Mixing ratio (wt %) | | |
|---|---|---|---|---|---|---|---|---|---|
| | A | | B | | C | | | | |
| | Composition | Grain size (μm) | Composition | Grain size (μm) | Composition | Grain size (μm) | A | B | C |
| Example 40 | Ti | 10 | Al | 10 | Si | 10 | 94 | 3 | 3 |
| Example 41 | Ti | 10 | Al | 10 | Si | 10 | 96 | 1 | 3 |
| Example 42 | Ti | 10 | Al | 10 | Si | 10 | 96 | 3 | 1 |
| Example 43 | Ti | 10 | Al | 10 | Si | 10 | 58 | 4 | 38 |
| Example 44 | Ti | 10 | Al | 10 | Si | 10 | 55 | 4 | 41 |
| Example 45 | Ti | 10 | Al | 10 | Si | 10 | 63 | 1 | 36 |
| Example 46 | Ti | 10 | Al | 10 | Si | 10 | 42 | 16 | 42 |
| Example 47 | Ti | 10 | Al | 10 | Si | 10 | 37 | 21 | 42 |
| Example 48 | Ti | 10 | Al | 10 | Si | 10 | 37 | 16 | 47 |
| Example 49 | Ti | 10 | Al | 10 | Si | 10 | 38 | 58 | 4 |
| Example 50 | Ti | 10 | Al | 10 | Si | 10 | 47 | 52 | 1 |
| Example 51 | Ti | 10 | $Al_2O_3$ | 10 | $Si_3N_4$ | 10 | 61 | 2 | 37 |
| Example 52 | Ti | 10 | $Al_2O_3$ | 10 | $Si_3N_4$ | 10 | 65 | 2 | 33 |
| Example 53 | Ti | 10 | $Al_2O_3$ | 10 | $Si_3N_4$ | 10 | 62.5 | 0.5 | 37 |
| Example 54 | Ti | 10 | Al | 10 | $SiO_2$ | 10 | 60 | 20 | 20 |
| Example 55 | Ti | 10 | Al | 10 | $SiO_2$ | 10 | 60 | 20 | 20 |
| Example 56 | Ti | 10 | $Al_2O_3$ | 10 | $Si_3N_4$ | 10 | 46 | 18 | 36 |
| Example 57 | Ti | 10 | $Al_2O_3$ | 10 | $Si_3N_4$ | 10 | 49 | 18 | 33 |
| Example 58 | Ti | 10 | $Al_2O_3$ | 10 | $Si_3N_4$ | 10 | 49 | 21 | 30 |

(Treatment Step)

Next, by executing the treatment step by using the made compact, second grains formed of Ti, Al, Si, O, and N were made. As the treatment step in each example, any one of the following methods (1) to (3) was used: (1) a method of heating the first grains in a reaction chamber in a desired atmosphere by using a heat source such as a carbon heater, subsequently evacuating the atmospheric gas, and introducing a cooling gas such as Ar (shown as "Gas rapid cooling" in Table 2), (2) a method of synthesizing the first grains by combustion in a reaction chamber in a desired atmosphere (shown as "Self-propagating high-temperature synthesis" in Table 2), and (3) a method of causing the first grains to pass through high temperature plasma in a reaction chamber in a desired atmosphere (shown as "High temperature plasma" in Table 2). Conditions of the treatment step in each example are shown in Table 2 below.

TABLE 2

| | Treatment conditions | | | | | |
|---|---|---|---|---|---|---|
| | Method | Temperature | Source gas | Heating time | Gas pressure | Cooling speed [° C./sec] |
| Example 1 | Gas rapid cooling | 1800° C. | Nitrogen | 1 hr. | 3 atm | 100 |
| Example 2 | Gas rapid cooling | 1800° C. | Nitrogen | 1 hr. | 3 atm | 100 |
| Example 3 | Gas rapid cooling | 1500° C. | Nitrogen | 1 hr. | 3 atm | 100 |
| Example 4 | Gas rapid cooling | 1400° C. | Nitrogen | 1 hr. | 3 atm | 100 |
| Example 5 | Gas rapid cooling | 1800° C. | Nitrogen | 1 hr. | 0.1 atm | 100 |
| Example 6 | Gas rapid cooling | 1800° C. | Nitrogen | 1 hr. | 0.05 atm | 100 |
| Example 7 | Gas rapid cooling | 1800° C. | Nitrogen | 1 hr. | 3 atm | 100 |
| Example 8 | Self-propagating high-temperature synthesis | 3000° C. | Nitrogen | 15 sec. | 100 atm | 200 |
| Example 9 | Self-propagating high-temperature synthesis | 3000° C. | Nitrogen | 15 sec. | 100 atm | 200 |
| Example 10 | Self-propagating high-temperature synthesis | 3000° C. | Nitrogen | 15 sec. | 10 atm | 200 |
| Example 11 | High temperature plasma | 4500° C. | Nitrogen | 1 sec. | 0.1 atm | 1000 |
| Example 12 | High temperature plasma | 4500° C. | Nitrogen | 1 sec. | 0.1 atm | 1000 |
| Example 13 | High temperature plasma | 3000° C. | Nitrogen | 1 sec. | 0.1 atm | 1000 |
| Example 14 | High temperature plasma | 4500° C. | Nitrogen | 0.5 sec. | 0.1 atm | 1000 |
| Example 15 | High temperature plasma | 4500° C. | Nitrogen | 1 sec. | 0.1 atm | 500 |
| Example 16 | Gas rapid cooling | 1800° C. | Nitrogen | 1 hr. | 3 atm | 100 |
| Example 17 | Gas rapid cooling | 1800° C. | Nitrogen | 1 hr. | 3 atm | 100 |
| Example 18 | Gas rapid cooling | 1800° C. | Nitrogen | 1 hr. | 3 atm | 100 |
| Example 19 | Self-propagating high-temperature synthesis | 2500° C. | Nitrogen | 15 sec. | 100 atm | 200 |
| Example 20 | Self-propagating high-temperature synthesis | 2500° C. | Nitrogen | 15 sec. | 100 atm | 200 |
| Example 21 | Self-propagating high-temperature synthesis | 2500° C. | Nitrogen | 15 sec. | 100 atm | 200 |
| Example 22 | High temperature plasma | 4500° C. | Nitrogen | 1 sec. | 0.1 atm | 1000 |
| Example 23 | High temperature plasma | 4500° C. | Nitrogen | 1 sec. | 0.1 atm | 1000 |
| Example 24 | High temperature plasma | 4500° C. | Nitrogen | 1 sec. | 0.1 atm | 1000 |
| Example 25 | Self-propagating high-temperature synthesis | 2500° C. | Nitrogen | 15 sec. | 100 atm | 200 |
| Example 26 | Self-propagating high-temperature synthesis | 2500° C. | Nitrogen | 15 sec. | 100 atm | 200 |
| Example 27 | Self-propagating high-temperature synthesis | 2500° C. | Nitrogen | 15 sec. | 100 atm | 200 |
| Example 28 | Self-propagating high-temperature synthesis | 3000° C. | Nitrogen | 15 sec. | 100 atm | 200 |
| Example 29 | Self-propagating high-temperature synthesis | 3000° C. | Nitrogen | 15 sec. | 100 atm | 200 |
| Example 30 | Self-propagating high-temperature synthesis | 2500° C. | Nitrogen | 15 sec. | 100 atm | 200 |
| Example 31 | Self-propagating high-temperature synthesis | 2500° C. | Nitrogen | 15 sec. | 100 atm | 200 |

TABLE 2-continued

| | | Treatment conditions | | | | |
|---|---|---|---|---|---|---|
| | Method | Temperature | Source gas | Heating time | Gas pressure | Cooling speed [° C./sec] |
| Example 32 | Self-propagating high-temperature synthesis | 3000° C. | Nitrogen | 15 sec. | 100 atm | 200 |
| Example 33 | Self-propagating high-temperature synthesis | 2500° C. | Nitrogen | 15 sec. | 100 atm | 200 |
| Example 34 | Self-propagating high-temperature synthesis | 2500° C. | Nitrogen | 15 sec. | 100 atm | 200 |
| Example 35 | Self-propagating high-temperature synthesis | 2500° C. | Nitrogen | 15 sec. | 100 atm | 200 |
| Example 36 | Gas rapid cooling | 1800° C. | Argon | 1 hr. | 1 atm | 100 |
| Example 37 | Gas rapid cooling | 1800° C. | Vacuum atmosphere | 1 hr. | 1 atm | 100 |
| Example 38 | Gas rapid cooling | 1800° C. | Argon | 1 hr. | 1 atm | 100 |
| Example 39 | Gas rapid cooling | 1800° C. | Vacuum atmosphere | 1 hr. | 1 atm | 100 |
| Example 40 | High temperature plasma | 4500° C. | Nitrogen | 1 sec. | 0.1 atm | 1000 |
| Example 41 | High temperature plasma | 4500° C. | Nitrogen | 1 sec. | 0.1 atm | 1000 |
| Example 42 | High temperature plasma | 4500° C. | Nitrogen | 1 sec. | 0.1 atm | 1000 |
| Example 43 | High temperature plasma | 4500° C. | Nitrogen | 1 sec. | 0.1 atm | 1000 |
| Example 44 | High temperature plasma | 4500° C. | Nitrogen | 1 sec. | 0.1 atm | 1000 |
| Example 45 | High temperature plasma | 4500° C. | Nitrogen | 1 sec. | 0.1 atm | 1000 |
| Example 46 | High temperature plasma | 4500° C. | Nitrogen | 1 sec. | 0.1 atm | 1000 |
| Example 47 | High temperature plasma | 4500° C. | Nitrogen | 1 sec. | 0.1 atm | 1000 |
| Example 48 | High temperature plasma | 4500° C. | Nitrogen | 1 sec. | 0.1 atm | 1000 |
| Example 49 | High temperature plasma | 4500° C. | Nitrogen | 1 sec. | 0.1 atm | 1000 |
| Example 50 | High temperature plasma | 4500° C. | Nitrogen | 1 sec. | 0.1 atm | 1000 |
| Example 51 | High temperature plasma | 4500° C. | Argon | 1 sec. | 0.1 atm | 1000 |
| Example 52 | High temperature plasma | 4500° C. | Argon | 1 sec. | 0.1 atm | 1000 |
| Example 53 | High temperature plasma | 4500° C. | Argon | 1 sec. | 0.1 atm | 1000 |
| Example 54 | High temperature plasma | 4500° C. | Nitrogen | 1 sec. | 0.1 atm | 1000 |
| Example 55 | High temperature plasma | 4500° C. | Nitrogen | 1 sec. | 0.1 atm | 1000 |
| Example 56 | High temperature plasma | 4500° C. | Argon | 1 sec. | 0.1 atm | 1000 |
| Example 57 | High temperature plasma | 4500° C. | Argon | 1 sec. | 0.1 atm | 1000 |
| Example 58 | High temperature plasma | 4500° C. | Argon | 1 sec. | 0.1 atm | 1000 |

Referring to the aforementioned Table 2, the methods (1) to (3) will be concretely described with reference to Examples 1, 8, and 11, respectively.

The treatment step in Example 1 by the method (1) was executed in the following manner. First, a compact was placed in a crucible having a gas inlet and a gas outlet. Then, the nitrogen gas was fed into the crucible, the gas pressure in the crucible was adjusted to 3 atm, and the interior of the crucible was heated at 1800° C. for 1 hour by using a carbon heater disposed around the crucible. In this manner, the first grains of Example 1 were subjected to a heating step at 1800° C. for 60 minutes in a nitrogen atmosphere.

After end of the heating step, the atmospheric gas was evacuated by a vacuum pump, Ar was introduced up to 3 atm to effect cooling, and the sample temperature was decreased to less than or equal to room temperature (25° C.). The cooling speed then was about 100° C./sec. In this manner, the precursor of second grains was subjected to the rapid cooling step, and a structure formed of Ti, Al, Si, O, and N was obtained.

Also in Examples 2 to 7, 16 to 18 and 36 to 39, the treatment step was executed in the same manner as in Example 1 except that various conditions were changed as shown in Table 2.

The treatment step in Example 8 by the method (2) was executed in the following manner. First, a compact was placed in a pressure vessel having a gas inlet and a gas outlet. Then, the pressure of the nitrogen gas in the pressure vessel was elevated to 10 MPa (100 atm), and part of the compact was heated by using a heat source such as a tungsten filament to synthesize the first grains by combustion. The combustion time then was 15 seconds, and the heating temperature was 3000° C. In this manner, the first grains of Example 8 were subjected to the heating step at 3000° C. for 15 seconds in a nitrogen atmosphere.

In the self-propagating high-temperature synthesis, since the heat source only exists at the time of ignition, the temperature in the pressure vessel decreased immediately after a lapse of the combustion time, and the temperature of the first grains after the self-propagating high-temperature synthesis (precursor of second grains) rapidly decreased to room temperature accordingly. The cooling speed then was about 200° C./sec. In this manner, the precursor of second grains was subjected to a rapid cooling step, and a structure formed of Ti, Al, Si, O, and N was obtained.

Also in Examples 9, 10, 19 to 21, and 25 to 35, the treatment step was executed in the same manner as in Example 8 except that various conditions were changed as shown in Table 2.

The treatment step in Example 11 by the method (3) was executed in the following manner. First, while the nitrogen gas was fed into the pressure vessel so that the gas pressure was 0.1 atm, high temperature plasma at 4500° C. was generated from a plasma generating electrode provided inside the pressure vessel, and the first grains were passed through the plasma. The treatment time then was 1 second. In this manner, the first grains of Example 11 were subjected to the heating step at 4500° C. for 1 second in a nitrogen atmosphere.

The cooling speed in the rapid cooling step after the heating step was about 1000° C./sec. In this manner, the precursor of second grains was subjected to a cooling step, and a structure formed of Ti, Al, Si, O, and N was obtained. The rapid cooling step was conducted consecutively by ending of the heating step.

Also in Examples 12 to 15, 22 to 24, and 40 to 58, the treatment step was executed in the same manner as in Example 1 except that various conditions were changed as shown in Table 2.

Comparative Examples 1 and 2

In Comparative example 1, a powder of TiN was produced, and in Comparative example 2, a powder of TiAlN was produced. Concretely, in Comparative example 1, TiN (atomic ratio is 1:0.97) grains having a grain size of 1 μm were prepared. In Comparative example 2, AlTiN (atomic ratio is 0.5:0.5:1) grains having a grain size of 1 μm were prepared.

<<Evaluation of Characteristics of Respective Grains>>

Compositions of respective grains of Examples 1 to 58, and oxidation resistance of respective grains of Examples 1 to 58 and Comparative examples 1 and 2 were examined.

(Composition)

A product (compound) and the content rate (% by volume) of the TiAlSiON compound contained in the second grains obtained in Examples 1 to 58 are shown in Table 3. Among the contained products, compositions of compounds other than the TiAlSiON compound were identified by analyzing the cross section and the surface of the grains by an XRD (X-ray diffraction) device, and the composition of the TiAlSiON compound was calculated by conducting EDX (energy-dispersive X-ray spectrometry). In addition, a process was conducted to make the cross section of the obtained powder observable. The cross section of the powder was observed with a scanning electron-microscope, and the TiSiAlON compound was discriminated by the tone of the color in the powder. At this time, each compound was identified in advance by an elemental analysis. Further, for the visual view, binarization was conducted to quantify the TiSiAlON compound.

TABLE 3

| | Second grains | | | | | | |
|---|---|---|---|---|---|---|---|
| | XRD | $Ti_{(1-a-b)}Al_aSi_bO_xN_y$ | | | | Content rate of first compound | Evaluation Oxidation start temperature |
| | Product (wt %) | a | b | x | y | (vol %) | (° C.) |
| Example 1 | TiAlSiON, AlN, $Si_3N_4$ | 0.15 | 0.15 | 0.05 | 0.90 | 86 | 550 |
| Example 2 | TiAlSiON, AlN, $Si_3N_4$ | 0.15 | 0.15 | 0.01 | 0.90 | 87 | 550 |
| Example 3 | TiAlSiON, AlN, $Si_3N_4$ | 0.15 | 0.15 | 0.01 | 0.85 | 80 | 540 |
| Example 4 | TiAlSiON, AlN, $Si_3N_4$ | 0.15 | 0.15 | 0.01 | 0.80 | 72 | 540 |
| Example 5 | TiAlSiON, AlN, $Si_3N_4$ | 0.15 | 0.15 | 0.01 | 0.70 | 82 | 530 |
| Example 6 | TiAlSiON, AlN, $Si_3N_4$ | 0.15 | 0.15 | 0.01 | 0.60 | 94 | 530 |
| Example 7 | TiAlSiON, AlN, $Si_3N_4$ | 0.15 | 0.15 | 0.01 | 0.80 | 84 | 540 |
| Example 8 | TiAlSiON, AlN, $Si_3N_4$ | 0.15 | 0.15 | 0.01 | 0.90 | 82 | 550 |
| Example 9 | TiAlSiON, AlN, $Si_3N_4$ | 0.15 | 0.15 | 0.01 | 0.90 | 72 | 550 |
| Example 10 | TiAlSiON, AlN, $Si_3N_4$ | 0.15 | 0.15 | 0.01 | 0.60 | 76 | 530 |
| Example 11 | TiAlSiON | 0.15 | 0.15 | 0.01 | 0.70 | 100 | 530 |
| Example 12 | TiAlSiON, AlN, $Si_3N_4$ | 0.15 | 0.15 | 0.01 | 0.70 | 85 | 530 |
| Example 13 | TiAlSiON, AlN, $Si_3N_4$ | 0.15 | 0.15 | 0.01 | 0.70 | 77 | 530 |
| Example 14 | TiAlSiON, AlN, $Si_3N_4$ | 0.15 | 0.15 | 0.01 | 0.60 | 91 | 530 |
| Example 15 | TiAlSiON, AlN, $Si_3N_4$ | 0.15 | 0.15 | 0.01 | 0.70 | 84 | 540 |
| Example 16 | TiAlSiON, AlN, $Si_3N_4$ | 0.16 | 0.09 | 0.01 | 0.90 | 91 | 550 |
| Example 17 | TiAlSiON, $Al_2O_3$, $Si_3N_4$ | 0.09 | 0.16 | 0.30 | 0.50 | 93 | 530 |
| Example 18 | TiAlSiON, AlN, $Si_3N_4$ | 0.18 | 0.18 | 0.01 | 0.90 | 78 | 560 |
| Example 19 | TiAlSiON, AlN, $Si_3N_4$ | 0.16 | 0.09 | 0.01 | 0.90 | 88 | 550 |
| Example 20 | TiAlSiON, $Al_2O_3$, $Si_3N_4$ | 0.09 | 0.16 | 0.30 | 0.50 | 81 | 550 |
| Example 21 | TiAlSiON, AlN, $Si_3N_4$ | 0.35 | 0.34 | 0.01 | 0.90 | 83 | 700 |
| Example 22 | TiAlSiON, AlN, $Si_3N_4$ | 0.16 | 0.09 | 0.01 | 0.90 | 81 | 550 |
| Example 23 | TiAlSiON, $Al_2O_3$, $Si_3N_4$ | 0.09 | 0.16 | 0.30 | 0.50 | 85 | 550 |
| Example 24 | TiAlSiON, AlN, $Si_3N_4$ | 0.18 | 0.18 | 0.01 | 0.90 | 75 | 570 |
| Example 25 | TiAlSiON, AlN, $Si_3N_4$ | 0.23 | 0.08 | 0.01 | 0.90 | 92 | 550 |
| Example 26 | TiAlSiON, AlN, $Si_3N_4$ | 0.23 | 0.08 | 0.01 | 0.90 | 82 | 550 |
| Example 27 | TiAlSiON, $Si_3N_4$ | 0.23 | 0.08 | 0.01 | 0.90 | 99 | 550 |
| Example 28 | TiAlSiON, AlN, $Si_3N_4$ | 0.24 | 0.05 | 0.01 | 0.90 | 98 | 550 |
| Example 29 | TiAlSiON, AlN, $Si_3N_4$ | 0.70 | 0.07 | 0.01 | 0.90 | 60 | 680 |
| Example 30 | TiAlSiON, $Al_2O_3$, $Si_3N_4$ | 0.56 | 0.11 | 0.30 | 0.50 | 51 | 680 |
| Example 31 | TiAlSiON, AlN, $Si_3N_4$ | 0.61 | 0.10 | 0.01 | 0.90 | 77 | 690 |
| Example 32 | TiAlSiON, AlN, $Si_3N_4$ | 0.44 | 0.44 | 0.01 | 0.90 | 88 | 700 |
| Example 33 | TiAlSiON, AlN, $Si_3N_4$ | 0.44 | 0.44 | 0.01 | 0.90 | 82 | 700 |
| Example 34 | TiAlSiON, SiAlON | 0.08 | 0.42 | 0.20 | 0.70 | 91 | 650 |
| Example 35 | TiAlSiON, AlN, $SiO_2$ | 0.15 | 0.41 | 0.30 | 0.50 | 76 | 650 |
| Example 36 | TiAlSiON, AlN, $SiO_2$ | 0.70 | 0.15 | 0.50 | 0.50 | 76 | 700 |
| Example 37 | TiAlSiON, AlN, $SiO_2$ | 0.66 | 0.15 | 0.50 | 0.50 | 80 | 700 |
| Example 38 | TiAlSiON, $Al_2O_3$, $Si_3N_4$ | 0.23 | 0.26 | 0.50 | 0.50 | 91 | 570 |
| Example 39 | TiAlSiON, $Al_2O_3$, $Si_3N_4$ | 0.23 | 0.26 | 0.50 | 0.50 | 80 | 570 |
| Example 40 | TiAlSiON | 0.05 | 0.05 | 0.01 | 0.90 | 100 | 480 |
| Example 41 | TiAlSiON | 0.01 | 0.05 | 0.01 | 0.90 | 100 | 460 |
| Example 42 | TiAlSiON | 0.05 | 0.01 | 0.01 | 0.90 | 100 | 460 |
| Example 43 | TiAlSiON | 0.05 | 0.50 | 0.01 | 0.90 | 100 | 550 |
| Example 44 | TiAlSiON | 0.05 | 0.55 | 0.01 | 0.90 | 100 | 500 |
| Example 45 | TiAlSiON | 0.01 | 0.50 | 0.01 | 0.90 | 100 | 490 |
| Example 46 | TiAlSiON | 0.20 | 0.50 | 0.01 | 0.90 | 100 | 700 |
| Example 47 | TiAlSiON | 0.25 | 0.50 | 0.01 | 0.90 | 100 | 650 |
| Example 48 | TiAlSiON | 0.20 | 0.55 | 0.01 | 0.90 | 100 | 650 |
| Example 49 | TiAlSiON | 0.70 | 0.05 | 0.01 | 0.90 | 100 | 680 |
| Example 50 | TiAlSiON | 0.70 | 0.01 | 0.01 | 0.90 | 100 | 610 |
| Example 51 | TiAlSiON | 0.02 | 0.40 | 0.05 | 0.50 | 100 | 600 |
| Example 52 | TiAlSiON | 0.02 | 0.30 | 0.05 | 0.45 | 100 | 580 |
| Example 53 | TiAlSiON | 0.01 | 0.38 | 0.01 | 0.50 | 100 | 530 |
| Example 54 | TiAlSiON | 0.31 | 0.14 | 0.01 | 0.99 | 100 | 520 |

TABLE 3-continued

| | | Second grains | | | | | |
|---|---|---|---|---|---|---|---|
| | XRD | $Ti_{(1-a-b)}Al_aSi_bO_xN_y$ | | | | Content rate of first compound | Evaluation Oxidation start temperature |
| | Product (wt %) | a | b | x | y | (vol %) | (° C.) |
| Example 55 | TiAlSiON | 0.31 | 0.14 | 0.005 | 0.99 | 100 | 480 |
| Example 56 | TiAlSiON | 0.17 | 0.37 | 0.50 | 0.50 | 100 | 560 |
| Example 57 | TiAlSiON | 0.17 | 0.34 | 0.50 | 0.45 | 100 | 520 |
| Example 58 | TiAlSiON | 0.20 | 0.31 | 0.60 | 0.40 | 100 | 520 |

Regarding the column of "Product" in Table 3, for example, "TiAlSiON" indicates a "TiAlSiON compound", and "$Si_3N_4$" indicates a $Si_3N_4$ compound. The composition of the TiAlSiON compound is shown in the column of "$Ti_{(1-a-b)}Al_aSi_bO_xN_y$". The content rate of the TiAlSiON compound is shown in the column of "Content rate of first compound".

Referring to Table 3, it was confirmed that the sintered material was formed of the first compound containing the TiAlSiON compound in Examples 1 to 58. It was also confirmed that the TiAlSiON compound satisfied $Ti_{(1-a-b)}Al_aSi_bO_xN_y$ (wherein a, b, x and y respectively satisfy $0.01 \leq a \leq 0.70$, $0.01 \leq b \leq 0.55$, $0.06 \leq a+b \leq 0.88$, $0.005 \leq x \leq 0.6$, $0.4 \leq y \leq 0.995$, and $0.5 < x+y \leq 1$).

(Oxidation Resistance)

Each 0.5 mg of the respective grains of Examples 1 to 58 and Comparative examples 1 and 2 were weighted and a test subject was prepared. For each test subject, a differential thermal analysis was conducted while the temperature was gradually elevated from room temperature (25° C.) to 1400° C. in an air atmosphere. The lowest temperature at which change in weight of each test subject was observed was determined as an oxidation start temperature. The respective results of Examples 1 to 58 are shown in Table 3.

Referring to Table 3, the oxidation start temperature was greater than or equal to 460° C. in any of the second grains of Examples 1 to 58. Meanwhile, the oxidation start temperature was 400° C. and 450° C., respectively in the respective grains of Comparative examples 1 and 2. In Table 3, a higher "oxidation start temperature" indicates more excellent oxidation resistance.

[Study 2]

Taking the respective grains of Examples 1, 11, and 27 and Comparative examples 1 and 2 as second grains, a sintered material was produced by executing the mixing step of mixing the second grains with the third grains, and the sintering step, and characteristics of the sintered bodies were evaluated.

Examples 61 to 125 and Comparative Examples 3 to 6

(Mixing Step)

In Examples 61 to 125 and Comparative examples 3 to 6, the mixing step was executed by using the second grains and the third grains shown in Tables 4 and 5. Referring to Table 5, for example, in Example 61, mixed grains were prepared by mixing the second grains produced in Example 1 with the third grains formed of cubic boron nitride (cBN) in a mixing ratio (second grains:third grains) of 50:50 by volume.

(Sintering Step)

Next, a capsule made of tantalum was charged with the obtained mixed grains, and a sintering treatment was conducted by using a press machine at a pressure, a temperature and a sintering time as shown in Tables 4 and 5 below.

In the manner as described above, the sintered bodies containing the first compound containing the TiAlSiON compound and the second compound were obtained in Examples 61 to 125. Also in Comparative examples 3 to 6, sintered bodies containing a compound derived from the second grains and a compound derived from the third grains were obtained. Each sintered material had a circular disc shape having a diameter of 20 mm and a height of 1 mm.

TABLE 4

| | | Mixing conditions | | | | | | |
|---|---|---|---|---|---|---|---|---|
| | | Third grains | | | Mixing ratio (vol %) | | Sintering | |
| | Second grains | Compound | Grain size (μm) | | Second | Third | Pressure | Temperature | Time |
| Example 61 | Example 1 | cBN | 3 | | 50 | 50 | 6 GPa | 1300° C. | 15 min. |
| Example 62 | Example 1 | AlN | 3 | | 50 | 50 | 6 GPa | 1300° C. | 15 min. |
| Example 63 | Example 1 | $Al_2O_3$ | 3 | | 50 | 50 | 6 GPa | 1300° C. | 15 min. |
| Example 64 | Example 1 | TiN | 3 | | 50 | 50 | 6 GPa | 1300° C. | 15 min. |
| Example 65 | Example 1 | TiC | 3 | | 50 | 50 | 6 GPa | 1300° C. | 15 min. |
| Example 66 | Example 1 | ZrN | 3 | | 50 | 50 | 6 GPa | 1300° C. | 15 min. |
| Example 67 | Example 1 | ZrC | 3 | | 50 | 50 | 6 GPa | 1300° C. | 15 min. |
| Example 68 | Example 1 | $ZrO_2$ | 3 | | 50 | 50 | 6 GPa | 1300° C. | 15 min. |
| Example 69 | Example 1 | TaN | 3 | | 50 | 50 | 6 GPa | 1300° C. | 15 min. |
| Example 70 | Example 1 | TaC | 3 | | 50 | 50 | 6 GPa | 1300° C. | 15 min. |
| Example 71 | Example 1 | CrN | 3 | | 50 | 50 | 6 GPa | 1300° C. | 15 min. |
| Example 72 | Example 1 | WC | 3 | | 50 | 50 | 6 GPa | 1300° C. | 15 min. |
| Example 73 | Example 1 | NbN | 3 | | 50 | 50 | 6 GPa | 1300° C. | 15 min. |
| Example 74 | Example 1 | Co | 1 | | 80 | 20 | 6 GPa | 1300° C. | 15 min. |

TABLE 4-continued

| | | Third grains | | Mixing ratio (vol %) | | Sintering | | |
|---|---|---|---|---|---|---|---|---|
| | Second grains | Compound | Grain size (μm) | Second | Third | Pressure | Temperature | Time |
| Example 75 | Example 1 | Cu | 1 | 80 | 20 | 6 GPa | 1300° C. | 15 min. |
| Example 76 | Example 1 | Mo | 1 | 80 | 20 | 6 GPa | 1300° C. | 15 min. |
| Example 77 | Example 1 | cBN | 3 | 20 | 80 | 6 GPa | 1300° C. | 15 min. |
| Example 78 | Example 1 | cBN | 3 | 80 | 20 | 6 GPa | 1300° C. | 15 min. |
| Example 79 | Example 11 | cBN | 3 | 50 | 50 | 6 GPa | 1300° C. | 15 min. |
| Example 80 | Example 11 | AlN | 3 | 50 | 50 | 6 GPa | 1300° C. | 15 min. |
| Example 81 | Example 11 | $Al_2O_3$ | 3 | 50 | 50 | 6 GPa | 1300° C. | 15 min. |
| Example 82 | Example 11 | TiN | 3 | 50 | 50 | 6 GPa | 1300° C. | 15 min. |
| Example 83 | Example 11 | TiC | 3 | 50 | 50 | 6 GPa | 1300° C. | 15 min. |
| Example 84 | Example 11 | ZrN | 3 | 50 | 50 | 6 GPa | 1300° C. | 15 min. |
| Example 85 | Example 11 | ZrC | 3 | 50 | 50 | 6 GPa | 1300° C. | 15 min. |
| Example 86 | Example 11 | $ZrO_2$ | 3 | 50 | 50 | 6 GPa | 1300° C. | 15 min. |
| Example 87 | Example 11 | TaN | 3 | 50 | 50 | 6 GPa | 1300° C. | 15 min. |
| Example 88 | Example 11 | TaC | 3 | 50 | 50 | 6 GPa | 1300° C. | 15 min. |
| Example 89 | Example 11 | CrN | 3 | 50 | 50 | 6 GPa | 1300° C. | 15 min. |
| Example 90 | Example 11 | WC | 3 | 50 | 50 | 6 GPa | 1300° C. | 15 min. |
| Example 91 | Example 11 | NbN | 3 | 50 | 50 | 6 GPa | 1300° C. | 15 min. |
| Example 92 | Example 11 | Co | 1 | 80 | 20 | 6 GPa | 1300° C. | 15 min. |
| Example 93 | Example 11 | Cu | 1 | 80 | 20 | 6 GPa | 1300° C. | 15 min. |
| Example 94 | Example 11 | Mo | 1 | 80 | 20 | 6 GPa | 1300° C. | 15 min. |
| Example 95 | Example 11 | cBN | 3 | 20 | 80 | 6 GPa | 1300° C. | 15 min. |
| Example 96 | Example 11 | cBN | 3 | 80 | 20 | 6 GPa | 1300° C. | 15 min. |
| Example 97 | Example 27 | cBN | 3 | 50 | 50 | 6 GPa | 1300° C. | 15 min. |
| Example 98 | Example 27 | AlN | 3 | 50 | 50 | 6 GPa | 1300° C. | 15 min. |
| Example 99 | Example 27 | $Al_2O_3$ | 3 | 50 | 50 | 6 GPa | 1300° C. | 15 min. |
| Example 100 | Example 27 | TiN | 3 | 50 | 50 | 6 GPa | 1300° C. | 15 min. |
| Example 101 | Example 27 | TiC | 3 | 50 | 50 | 6 GPa | 1300° C. | 15 min. |
| Example 102 | Example 27 | ZrN | 3 | 50 | 50 | 6 GPa | 1300° C. | 15 min. |
| Example 103 | Example 27 | ZrC | 3 | 50 | 50 | 6 GPa | 1300° C. | 15 min. |
| Example 104 | Example 27 | $ZrO_2$ | 3 | 50 | 50 | 6 GPa | 1300° C. | 15 min. |
| Example 105 | Example 27 | TaN | 3 | 50 | 50 | 6 GPa | 1300° C. | 15 min. |
| Example 106 | Example 27 | TaC | 3 | 50 | 50 | 6 GPa | 1300° C. | 15 min. |
| Example 107 | Example 27 | CrN | 3 | 50 | 50 | 6 GPa | 1300° C. | 15 min. |
| Example 108 | Example 27 | WC | 3 | 50 | 50 | 6 GPa | 1300° C. | 15 min. |
| Example 109 | Example 27 | NbN | 3 | 50 | 50 | 6 GPa | 1300° C. | 15 min. |
| Example 110 | Example 27 | Co | 1 | 80 | 20 | 6 GPa | 1300° C. | 15 min. |
| Example 111 | Example 27 | Cu | 1 | 80 | 20 | 6 GPa | 1300° C. | 15 min. |
| Example 112 | Example 27 | Mo | 1 | 80 | 20 | 6 GPa | 1300° C. | 15 min. |
| Example 113 | Example 27 | cBN | 3 | 20 | 80 | 6 GPa | 1300° C. | 15 min. |
| Example 114 | Example 27 | cBN | 3 | 80 | 20 | 6 GPa | 1300° C. | 15 min. |
| Example 115 | Example 27 | $Al_2O_3$ | 3 | 50 | 50 | 50 MPa | 1300° C. | 15 min. |
| Example 116 | Example 27 | TiN | 3 | 50 | 50 | 50 MPa | 1300° C. | 15 min. |
| Example 117 | Example 27 | $ZrO_2$ | 3 | 50 | 50 | 50 MPa | 1300° C. | 15 min. |
| Example 118 | Example 27 | Co | 1 | 50 | 50 | 50 MPa | 1300° C. | 15 min. |
| Example 119 | Example 27 | — | — | 100 | 0 | 50 MPa | 1300° C. | 15 min. |
| Example 120 | Example 1 | cBN | 3 | 9 | 91 | 6 GPa | 1300° C. | 15 min. |
| Example 121 | Example 1 | $Al_2O_3$ | 3 | 9 | 91 | 6 GPa | 1300° C. | 15 min. |
| Example 122 | Example 11 | cBN | 3 | 9 | 91 | 6 GPa | 1300° C. | 15 min. |
| Example 123 | Example 11 | $Al_2O_3$ | 3 | 9 | 91 | 6 GPa | 1300° C. | 15 min. |
| Example 124 | Example 27 | cBN | 3 | 9 | 91 | 6 GPa | 1300° C. | 15 min. |
| Example 125 | Example 27 | $Al_2O_3$ | 3 | 9 | 91 | 6 GPa | 1300° C. | 15 min. |

TABLE 5

| | | Third grains | | Mixing ratio (vol %) | | Sintering | | |
|---|---|---|---|---|---|---|---|---|
| | Second grains | Compound | Grain size (μm) | Second | Third | Pressure | Temperature | Time |
| Comparative example 3 | Comparative example 1 | cBN | 3 | 50 | 50 | 6 GPa | 1300° C. | 15 min. |
| Comparative example 4 | Comparative example 2 | cBN | 3 | 50 | 50 | 6 GPa | 1300° C. | 15 min. |
| Comparative example 5 | Comparative example 1 | Co | 3 | 80 | 20 | 6 GPa | 1300° C. | 15 min. |

TABLE 5-continued

| | | Mixing conditions | | | | Sintering | | |
|---|---|---|---|---|---|---|---|---|
| | | Third grains | | Mixing ratio (vol %) | | | | |
| | Second grains | Compound | Grain size (μm) | Second | Third | Pressure | Temperature | Time |
| Comparative example 6 | Comparative example 2 | Co | 3 | 80 | 20 | 6 GPa | 1300° C. | 15 min. |

<<Evaluation of Characteristics of Each Sintered Material>>

For each sintered material of Examples 61 to 125 and Comparative examples 3 to 6, composition, abrasion resistance, and chipping resistance were examined.

(Composition)

A product (compound, metal) and the content (% by volume) of the TiAlSiON compound contained in the sintered bodies obtained in Examples 61 to 125 and Comparative examples 3 to 6 are shown in Table 6, and the content rate (% by volume) of TiN or TiAlN is shown in Table 7. Among the contained products, compositions of compounds other than the TiAlSiON compound were identified by analyzing the cross section and the surface of the sintered material by an XRD (X-ray diffraction) device, and the composition of the TiAlSiON compound was calculated by conducting EDX (energy-dispersive X-ray spectrometry). In addition, a process was conducted to make the cross section of the obtained sintered material observable, the cross section of the sintered material was observed with a scanning electron-microscope, and the TiSiAlON compound was discriminated by the tone of the color in the sintered material. At this time, each compound was identified in advance by an elemental analysis. Further, for the visual view, binarization was conducted to quantify the TiSiAlON compound.

TABLE 6

| | XRD | $Ti_{(1-a-b)}Al_aSi_bO_xN_y$ | | | | First compound content rate | Result of cutting test | |
|---|---|---|---|---|---|---|---|---|
| | Product (vol %) | a | b | x | y | (vol %) | Wear at flank face (μm) | Chipping amount (μm) |
| Example 61 | cBN, TiSiAlON, AlN, $Si_3N_4$, $TiB_2$ | 0.15 | 0.15 | 0.05 | 0.90 | 41 | 67 | 10 |
| Example 62 | AlN, TiSiAlON, $Si_3N_4$ | 0.15 | 0.15 | 0.05 | 0.90 | 44 | 81 | 10 |
| Example 63 | $Al_2O_3$, TiSiAlON, $Si_3N_4$, AlN | 0.15 | 0.15 | 0.05 | 0.90 | 44 | 90 | 12 |
| Example 64 | TiN, TiSiAlON, $Si_3N_4$, AlN | 0.15 | 0.15 | 0.05 | 0.90 | 44 | 71 | 14 |
| Example 65 | TiC, TiSiAlON, $Si_3N_4$, AlN | 0.15 | 0.15 | 0.05 | 0.90 | 44 | 69 | 15 |
| Example 66 | ZrN, TiSiAlON, $Si_3N_4$, AlN | 0.15 | 0.15 | 0.05 | 0.90 | 44 | 71 | 13 |
| Example 67 | ZrC, TiSiAlON, $Si_3N_4$, AlN | 0.15 | 0.15 | 0.05 | 0.90 | 44 | 73 | 12 |
| Example 68 | $ZrO_2$, TiSiAlON, $Si_3N_4$, AlN | 0.15 | 0.15 | 0.05 | 0.90 | 44 | 75 | 10 |
| Example 69 | TaN, TiSiAlON, $Si_3N_4$, AlN | 0.15 | 0.15 | 0.05 | 0.90 | 44 | 81 | 14 |
| Example 70 | TaC, TiSiAlON, $Si_3N_4$, AlN | 0.15 | 0.15 | 0.05 | 0.90 | 44 | 79 | 11 |
| Example 71 | CrN, TiSiAlON, $Si_3N_4$, AlN | 0.15 | 0.15 | 0.05 | 0.90 | 44 | 83 | 12 |
| Example 72 | WC, TiSiAlON, $Si_3N_4$, AlN | 0.15 | 0.15 | 0.05 | 0.90 | 44 | 76 | 13 |
| Example 73 | NbN, TiSiAlON, $Si_3N_4$, AlN | 0.15 | 0.15 | 0.05 | 0.90 | 44 | 82 | 11 |
| Example 74 | TiSiAlON, $Si_3N_4$, AlN, Co, $CoSi_2$ | 0.15 | 0.15 | 0.05 | 0.90 | 76 | 92 | 0 |
| Example 75 | TiSiAlON, $Si_3N_4$, AlN, Cu | 0.15 | 0.15 | 0.05 | 0.90 | 76 | 93 | 0 |
| Example 76 | TiSiAlON, $Si_3N_4$, AlN, Mo, $Mo_2N$ | 0.15 | 0.15 | 0.05 | 0.90 | 16 | 94 | 0 |
| Example 77 | cBN, TiSiAlON, AlN, $Si_3N_4$, $TiB_2$ | 0.15 | 0.15 | 0.05 | 0.90 | 71 | 100 | 5 |
| Example 78 | TiSiAlON, cBN, AlN, $Si_3N_4$, $TiB_2$ | 0.15 | 0.15 | 0.05 | 0.90 | 47 | 52 | 10 |
| Example 79 | cBN, TiSiAlON, $TiB_2$, $SiB_4$ | 0.15 | 0.15 | 0.01 | 0.70 | 50 | 64 | 10 |
| Example 80 | AlN, TiSiAlON | 0.15 | 0.15 | 0.01 | 0.70 | 50 | 74 | 7 |
| Example 81 | $Al_2O_3$, TiSiAlON | 0.15 | 0.15 | 0.01 | 0.70 | 50 | 82 | 11 |
| Example 82 | TiN, TiSiAlON | 0.15 | 0.15 | 0.01 | 0.70 | 50 | 61 | 14 |
| Example 83 | TiC, TiSiAlON | 0.15 | 0.15 | 0.01 | 0.70 | 50 | 66 | 15 |
| Example 84 | ZrN, TiSiAlON | 0.15 | 0.15 | 0.01 | 0.70 | 50 | 68 | 16 |
| Example 85 | ZrC, TiSiAlON | 0.15 | 0.15 | 0.01 | 0.70 | 50 | 64 | 12 |
| Example 86 | $ZrO_2$, TiSiAlON | 0.15 | 0.15 | 0.01 | 0.70 | 50 | 65 | 9 |
| Example 87 | TaN, TiSiAlON | 0.15 | 0.15 | 0.01 | 0.70 | 50 | 79 | 13 |
| Example 88 | TaC, TiSiAlON | 0.15 | 0.15 | 0.01 | 0.70 | 50 | 77 | 13 |
| Example 89 | CrN, TiSiAlON | 0.15 | 0.15 | 0.01 | 0.70 | 50 | 75 | 11 |
| Example 90 | WC, TiSiAlON | 0.15 | 0.15 | 0.01 | 0.70 | 50 | 68 | 16 |
| Example 91 | NbN, TiSiAlON | 0.15 | 0.15 | 0.01 | 0.70 | 50 | 77 | 10 |
| Example 92 | TiSiAlON, Co, $CoSi_2$ | 0.15 | 0.15 | 0.01 | 0.70 | 82 | 99 | 0 |
| Example 93 | TiSiAlON, Cu | 0.15 | 0.15 | 0.01 | 0.70 | 82 | 111 | 0 |
| Example 94 | TiSiAlON, Mo, $Mo_2N$ | 0.15 | 0.15 | 0.01 | 0.70 | 71 | 121 | 1 |
| Example 95 | cBN, TiSiAlON, $TiB_2$, $Si_3N_4$ | 0.15 | 0.15 | 0.01 | 0.70 | 18 | 99 | 8 |
| Example 96 | TiSiAlON, cBN, $TiB_2$, $Si_3N_4$ | 0.15 | 0.15 | 0.01 | 0.70 | 77 | 43 | 12 |
| Example 97 | cBN, TiSiAlON, $TiB_2$, $Si_3N_4$ | 0.23 | 0.08 | 0.01 | 0.90 | 47 | 64 | 12 |
| Example 98 | AlN, TiSiAlON | 0.23 | 0.08 | 0.01 | 0.90 | 50 | 72 | 9 |
| Example 99 | $Al_2O_3$, TiSiAlON | 0.23 | 0.08 | 0.01 | 0.90 | 50 | 82 | 11 |
| Example 100 | TiN, TiSiAlON | 0.23 | 0.08 | 0.01 | 0.90 | 50 | 60 | 16 |
| Example 101 | TiC, TiSiAlON | 0.23 | 0.08 | 0.01 | 0.90 | 50 | 64 | 15 |

TABLE 6-continued

| | | | | | | First compound content rate | Result of cutting test | |
|---|---|---|---|---|---|---|---|---|
| | XRD | $Ti_{(1-a-b)}Al_aSi_bO_xN_y$ | | | | | Wear at flank face | Chipping amount |
| | Product (vol %) | a | b | x | y | (vol %) | (μm) | (μm) |
| Example 102 | ZrN, TiSiAlON | 0.23 | 0.08 | 0.01 | 0.90 | 50 | 70 | 16 |
| Example 103 | ZrC, TiSiAlON | 0.23 | 0.08 | 0.01 | 0.90 | 50 | 64 | 13 |
| Example 104 | ZrO$_2$, TiSiAlON | 0.23 | 0.08 | 0.01 | 0.90 | 50 | 64 | 8 |
| Example 105 | TaN, TiSiAlON | 0.23 | 0.08 | 0.01 | 0.90 | 50 | 77 | 14 |
| Example 106 | TaC, TiSiAlON | 0.23 | 0.08 | 0.01 | 0.90 | 50 | 77 | 15 |
| Example 107 | CrN, TiSiAlON | 0.23 | 0.08 | 0.01 | 0.90 | 50 | 73 | 10 |
| Example 108 | WC, TiSiAlON | 0.23 | 0.08 | 0.01 | 0.90 | 50 | 69 | 17 |
| Example 109 | NbN, TiSiAlON | 0.23 | 0.08 | 0.01 | 0.90 | 50 | 75 | 12 |
| Example 110 | TiSiAlON, Co, CoSi$_2$ | 0.23 | 0.08 | 0.01 | 0.90 | 82 | 101 | 0 |
| Example 111 | TiSiAlON, Cu | 0.23 | 0.08 | 0.01 | 0.90 | 82 | 112 | 2 |
| Example 112 | TiSiAlON, Mo, Mo$_2$N | 0.23 | 0.08 | 0.01 | 0.90 | 71 | 120 | 0 |
| Example 113 | cBN, TiSiAlON, TiB$_2$, Si$_3$N$_4$ | 0.23 | 0.08 | 0.01 | 0.90 | 18 | 100 | 7 |
| Example 114 | TiSiAlON, cBN, TiB$_2$, Si$_3$N$_4$ | 0.23 | 0.08 | 0.01 | 0.90 | 77 | 41 | 14 |
| Example 115 | Al$_2$O$_3$, TiSiAlON | 0.23 | 0.08 | 0.01 | 0.90 | 50 | 85 | 21 |
| Example 116 | TiN, TiSiAlON | 0.23 | 0.08 | 0.01 | 0.90 | 50 | 69 | 19 |
| Example 117 | ZrO$_2$, TiSiAlON | 0.23 | 0.08 | 0.01 | 0.90 | 50 | 89 | 18 |
| Example 118 | TiSiAlON, Co, CoSi$_2$ | 0.23 | 0.08 | 0.01 | 0.90 | 59 | 111 | 0 |
| Example 119 | TiSiAlN | 0.23 | 0.08 | 0.01 | 0.90 | 100 | 40 | 17 |
| Example 120 | cBN, TiSiAlON, AlN, Si$_3$N$_4$, TiB$_2$ | 0.15 | 0.15 | 0.05 | 0.9 | 8 | 101 | 18 |
| Example 121 | Al$_2$O$_3$, TiSiAlON, AlN, Si$_3$N$_4$ | 0.15 | 0.15 | 0.05 | 0.9 | 9 | 109 | 25 |
| Example 122 | cBN, TiSiAlON, TiB$_2$ | 0.15 | 0.15 | 0.01 | 0.7 | 8 | 111 | 14 |
| Example 123 | Al$_2$O$_3$, TiSiAlON | 0.15 | 0.15 | 0.01 | 0.7 | 9 | 110 | 16 |
| Example 124 | cBN, TiSiAlON, TiB$_2$ | 0.23 | 0.08 | 0.01 | 0.9 | 8 | 103 | 17 |
| Example 125 | Al$_2$O$_3$, TiSiAlON | 0.23 | 0.08 | 0.01 | 0.9 | 9 | 112 | 18 |

TABLE 7

| | | | | | | TiN or TiAlN content rate | Result of cutting test | |
|---|---|---|---|---|---|---|---|---|
| | XRD Product | $Ti_{(1-a-b)}Al_aSi_bO_xN_y$ | | | | | Wear at flank face | Chipping amount |
| | (vol %) | a | b | x | y | (vol %) | (μm) | (μm) |
| Comparative example 3 | cBN, TiN, TiB$_2$ | — | — | — | — | 48 | 131 | 21 |
| Comparative example 4 | cBN, TiAlN, TiB, AlN | — | — | — | — | 47 | 118 | 20 |
| Comparative example 5 | TiN, Co | — | — | — | — | 80 | 181 | 0 |
| Comparative example 6 | TiAlN, Co | — | — | — | — | 80 | 192 | 0 |

Regarding the column of "Product" in Tables 6 and 7, for example, "TiAlSiON" indicates a "TiAlSiON compound", and "Si$_3$N$_4$" indicates a Si$_3$N$_4$ compound. The composition of the TiAlSiON compound is shown in the column of "Ti$_{(1-a-b)}$Al$_a$Si$_b$O$_x$N$_y$". The content rate of the TiAlSiON compound is shown in the column of "Content rate of first compound".

Referring to Table 6, it was confirmed that, in Examples 61 to 125, each sintered material contains the TiAlSiON compound, and the TiAlSiON compound satisfies Ti$_{(1-a-b)}$Al$_a$Si$_b$O$_x$N$_y$ (wherein a, b, x and y respectively satisfy 0.01≤a≤0.70, 0.01≤b≤0.55, 0.06≤a+b≤0.88, 0.005≤x≤0.6, 0.4≤y≤0.995, and 0.5≤x+y≤1). On the other hand, regarding the content of the TiAlSiON compound, slight reduction, as converted from the mixing ratio between the second grains and the third grains, was observed in many cases.

These suggest that although the composition of the second grains does not change before and after the sintering step, a reaction product generates on the boundary due to the reaction with the third grains, and thus a slight change was observed in the mixing ratio before and after the sintering step. Since the composition of the second grains does not change before and after the sintering, it was also found that the TiAlSiON compound contained in the second grains and the TiAlSiON compound composing the first compound are the same compound, and thus the oxidation resistance of the first compound relies on the oxidation resistance of the second grains.

The sintered bodies of Examples 61 to 125 contained a product (compound or metal) other than the TiAlSiON compound. It was confirmed that a product other than the TiAlSiON compound was present on the boundary of the TiAlSiON compound.

(Abrasion Resistance and Chipping Resistance)

For sintered bodies of Examples 61 to 125 and Comparative examples 3 to 6, abrasion resistance and chipping resistance were evaluated in the following manner.

First, each sintered material was worked with a laser to produce a cutting tool having a chip form of ISO model number CNGA120408, and having a chamfer form with an edge processed at an angle of −25° and a width of 0.15 mm. Using each produced cutting tool, a cutting test was conducted in the following cutting conditions, and an average wear at flank face (μm) and chipping amount (μm) of the cutting tool were measured. The term "chipping" means a fine chip occurring in a cutting edge, and the term "chipping amount" means the width of the chip in the thickness direction of the edge of the cutting tool.

Work material: SCM415 quenching steel with grooves (HRc58-62) (Form: round bar with 2-mm-wide grooves at intervals of 1 cm)
  Cutting speed: 100 m/min.
  Feeding rate: 0.1 mm/rev
  Depth of cut: 0.1 mm
  Coolant: None
  Cutting distance: 4 km The results of evaluations are shown in Tables 6 and 7. In Tables 6 and 7, a smaller "Wear at flank face" indicates better abrasion resistance. Moreover, a smaller "chipping amount" indicates better chipping resistance.

Tables 6 and 7 reveal that the sintered bodies of Examples 61 to 125 are superior in characteristics such as abrasion resistance and chipping resistance to the sintered bodies of Comparative examples 3 to 6. Comparing Example 110 with Example 118, the sintered material of Example 110 was superior in characteristics. This is ascribable to the fact that the content (% by volume) of mixed Co grains was higher in Example 118.

It is to be understood that the embodiments and examples disclosed herein are illustrative, and are not limitative in every point. The scope of the present invention is specified by claims rather than by the aforementioned embodiments, and any modification within the equivalent meaning and the scope of claims are intended to be included in the present invention.

INDUSTRIAL APPLICABILITY

The sintered material according to the present invention can be widely used for cutting tools. In particular, it can be suitably used for cutting tools for work materials having high hardness at high temperature, and work materials formed of a heat-resistant alloy.

The invention claimed is:

1. A method for producing a sintered material, comprising the steps of:
  preparing first grains containing elements Ti, Al, and Si;
  treating said first grains to make second grains formed of elements Ti, Al, Si, O, and N; and
  sintering said second grains to make a sintered material containing a first compound formed of Ti, Al, Si, O, and N, wherein
  the step of making said second grains includes a step of heating said first grains, and a step of rapidly cooling said first grains after heating.

2. The method for producing a sintered material according to claim 1, further comprising a step of:
  mixing said second grains with third grains before the step of making said sintered material, wherein
  said third grains are grains formed of at least one selected from the group consisting of a fifth compound, a sixth compound, a seventh compound and a second metal,
  said fifth compound is cubic boron nitride,
  said sixth compound is a compound of at least one element selected from Al and Si, and at least one element selected from the group consisting of B, C, N, and O,
  said seventh compound is a compound of at least one element selected from the group consisting of elements in Group 4, elements in Group 5, and elements in Group 6 of the periodic table, and at least one element selected from the group consisting of B, C, N, and O, and
  said second metal is a metal formed of at least one selected from the group consisting of Ti, V, Cr, Mn, Co, Ni, Cu, Al, Sn, Si, Zr, Nb, Mo, Ag, Hf, Ta, W, and Pb.

3. The method for producing a sintered material according to claim 2, wherein said mixing step is executed in such a manner that a content of said third grains in mixed grains of said second grains and said third grains is less than or equal to 90% by volume.

* * * * *